Figure 1:
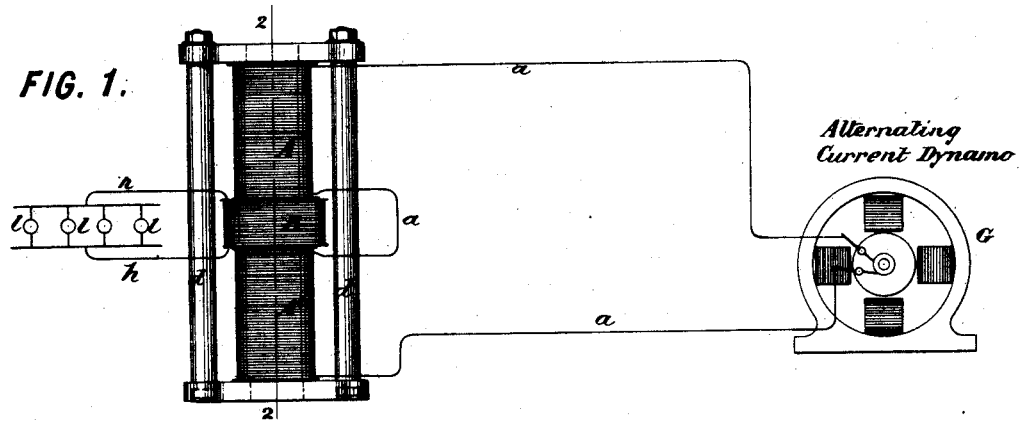

(No Model.) 3 Sheets—Sheet 1.

A. DE CASTRO.
MEANS FOR GENERATION AND CONVERSION OF ELECTRIC ENERGY.

No. 432,022. Patented July 15, 1890.

WITNESSES:
John Becker
Fred White

INVENTOR:
Angel de Castro,
By his Attorneys,
Arthur C. Fraser &c.

(No Model.) 3 Sheets—Sheet 2.

A. DE CASTRO.
MEANS FOR GENERATION AND CONVERSION OF ELECTRIC ENERGY.

No. 432,022. Patented July 15, 1890.

WITNESSES:
John Becker
Fred White

INVENTOR:
Angel de Castro,
By his Attorneys,
Arthur C. Fraser & Co (No Model.) 3 Sheets—Sheet 3.

A. DE CASTRO.
MEANS FOR GENERATION AND CONVERSION OF ELECTRIC ENERGY.

No. 432,022. Patented July 15, 1890.

WITNESSES:
John Becker
Fred White

INVENTOR:
Angel de Castro,
By his Attorneys,
Arthur G. Fraser &Co.

UNITED STATES PATENT OFFICE.

ANGEL DE CASTRO, OF NEW YORK, N. Y., ASSIGNOR TO THE DE CASTRO ELECTRIC GENERATOR COMPANY, OF SAME PLACE.

MEANS FOR GENERATION AND CONVERSION OF ELECTRIC ENERGY.

SPECIFICATION forming part of Letters Patent No. 432,022, dated July 15, 1890.

Application filed July 24, 1889. Serial No. 318,492. (No model.)

*To all whom it may concern:*

Be it known that I, ANGEL DE CASTRO, a citizen of the United States, residing in New York city, in the county and State of New York, have invented certain new and useful Improvements in Means for the Generation and Conversion of Electric Energy, of which the following is a specification.

This invention relates to improved means or apparatus for converting electric currents or pulsations generated by any suitable source of energy into currents or pulsations of different character suitable for any required use.

It also relates to apparatus for generating electric currents or pulsations.

The invention is characterized by the employment of finely subdivided or comminuted magnetizable metal, usually iron filings, arranged in such way as to be loose or free to move, so that the particles may vibrate and be subjected to the action of magnetic lines of force derived either from permanent or electro magnets or from an exciting coil or coils. The field of force in which the iron filings are thus placed is a varying field, being either made intermittent or of rapidly-alternating polarity, or being made pulsatory—that is, of rapidly increasing and decreasing intensity—or being otherwise changed, varied, or influenced in order to set the mass of iron filings into rapid motion or vibration. Any suitable coil or other arrangement of electric conductors may be arranged within inductive proximity to the vibrating mass of filings, and will be influenced thereby for the induction of vibratory or alternating currents or electric pulsations. Conversely, the particles of iron filings may be vibrated mechanically in any known way, and their vibrations may be made to influence inductively an electric coil or a magnet or piece of soft iron inductively connected to an electric circuit for the generation of electric waves or pulsations therein. In place of soft-iron filings, filings or particles of hard or magnetic iron or steel may be used, or the iron or steel may be in the form of minute globules or shot.

By the use of the term "iron filings" in this specification I am to be understood as meaning iron or steel or any analogous magnetic or magnetizable metal in any of these forms.

Figure 2:
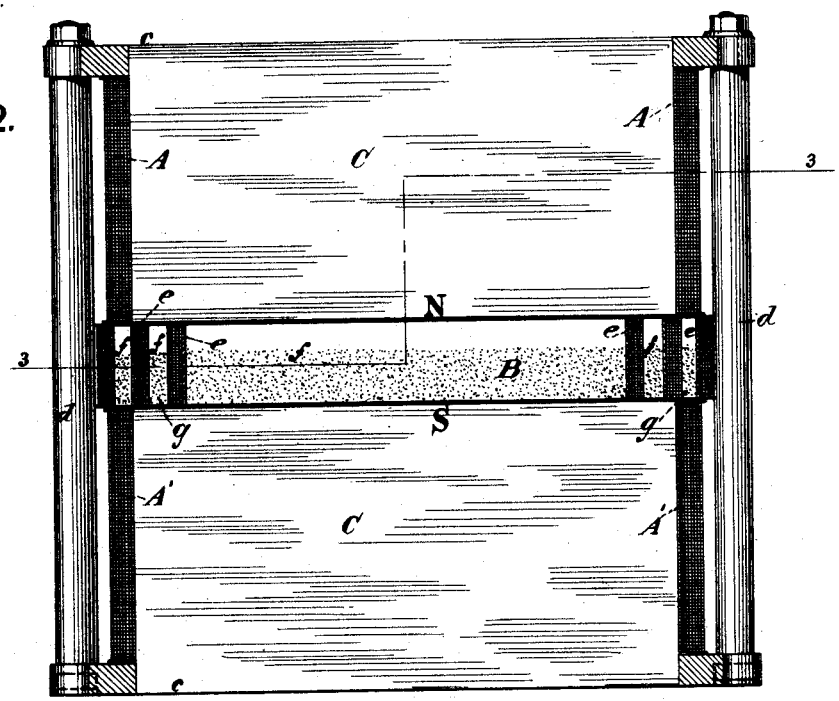
Figure 3:
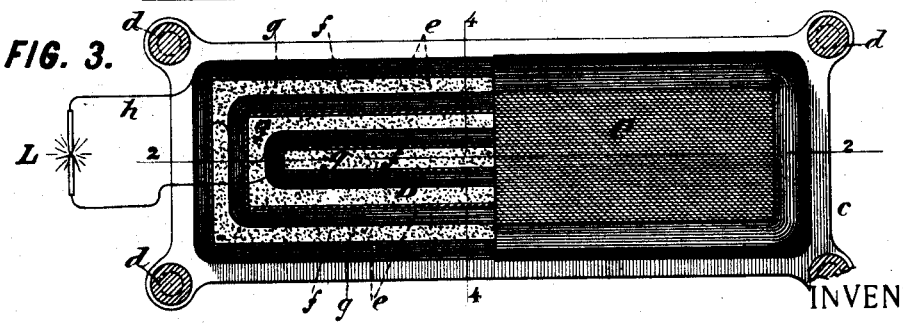
Figure 4:
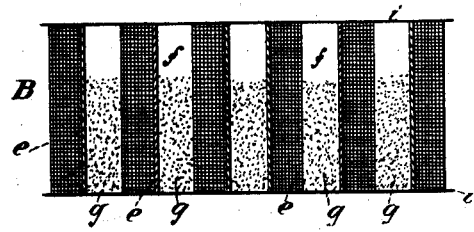
Figure 5:
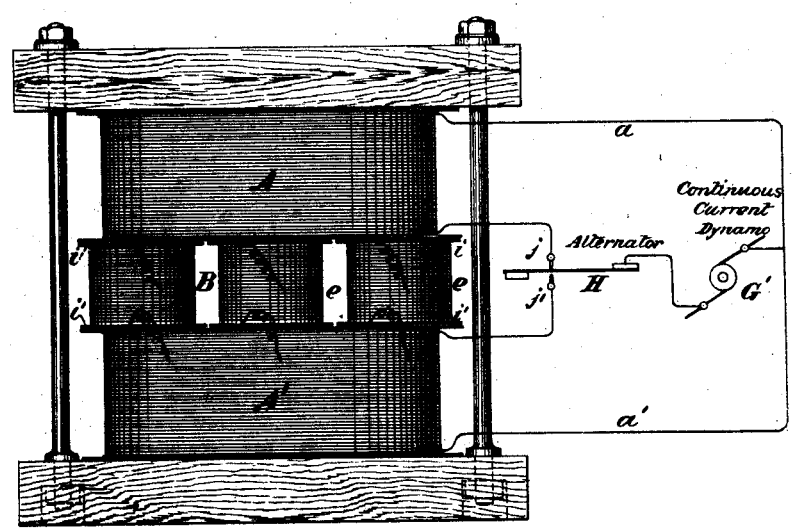
Figure 6:
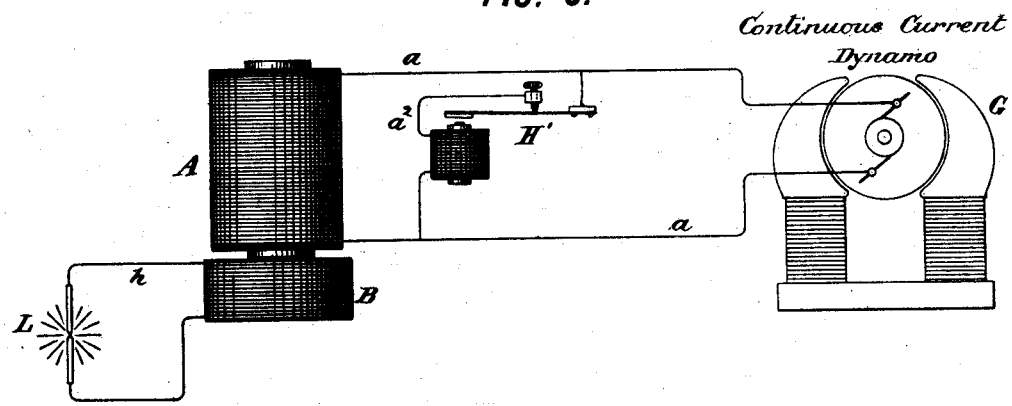
Figure 7:
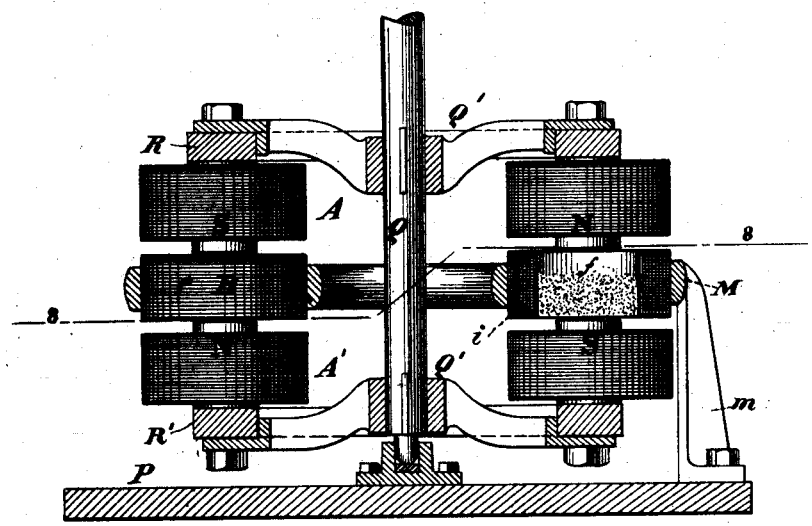
Figure 8:
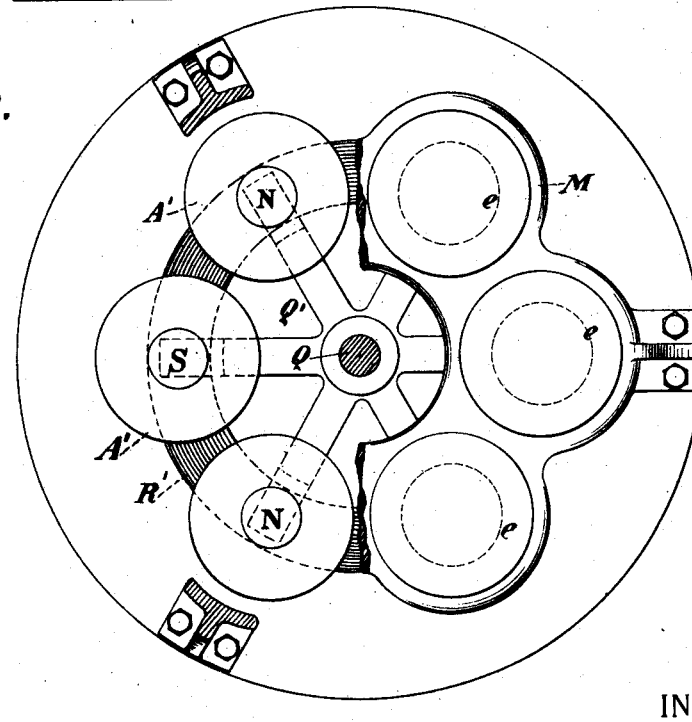

In the accompanying drawings, Figure 1 is a side elevation of one form of generating or converting instrument proposed by my invention, with the circuit-connections thereof shown in diagram. Fig. 2 is a front view thereof, in vertical mid-section, on the lines 2 2 in Figs. 1 and 3, and on a larger scale. Fig. 3 is a horizontal section, in the planes indicated by the line 3 3 in Fig. 2. Fig. 4 is a transverse section of the armature cut in the plane of the line 4 4 in Fig. 3, the view being on a still larger scale. Fig. 5 is a front elevation of a modified construction of converting-instrument. Fig. 6 is a view similar to Fig. 1, showing a further modification of the converting-instrument, and showing in diagram a modified series of circuit-connections. Figs. 7 and 8 show a generating machine or dynamo, Fig. 7 being a vertical section in the plane of the line 7 7 in Fig. 8, and Fig. 8 being a horizontal section in the planes denoted by the line 8 8 in Fig. 7.

I will first describe the construction shown in Figs. 1 to 4, inclusive. The coils A A' here shown are field or exciting coils, being included in a circuit $a$ $a$ and fed by an alternating-current dynamo or other generator of alternating currents or electric pulsations G. The coils A A' are shown as connected serially in the circuit $a$ $a$; but other known means of connection may be substituted. The coils are fitted with soft-iron cores C C, preferably laminated, as shown best in Fig. 3, by being built up of plates of soft iron arranged together to form a block or mass, and preferably clamped in or otherwise secured to iron top and bottom plates $c$ $c$. The cores C C may, however, be of solid iron or be laminated or subdivided in any other manner known to the art. Whatever be their particular construction, they are to be arranged with their opposite polar ends N S facing one another and spaced sufficiently apart to make room between them for an armature or inductor B, which consists of a coil or coils arranged to be traversed by the lines of force induced by the coils A A'; or, in other words, arranged to be inductively affected by the magnetic field or field of force between the poles N S. The outer ends or poles of the field-magnets are preferably connected together to form a closed magnetic circuit through the medium of posts or pillars $d\,d$, which also form a mechanical connection between the top and bottom plates $c\,c$, by which the whole structure is solidly united. Four of these pillars are shown; but any number may be used, or the magnetic circuit of the field-magnet may be closed in any other manner known to the art.

The inductor B, as best shown in Figs. 2, 3, and 4, is built up by preference of two or more coils $e\,e$ and intervening spaces or chambers $f\,f$, the latter being closed at the top and bottom by plates $i\,i$, of vulcanite, mica, or other non-magnetic substance. These spaces are partly filled with masses of iron filings $g\,g$, which should be sufficient to about two-thirds fill the spaces or chambers.

In a state of rest the iron filings are held by gravity in the lower portions of the chambers, as shown in Fig. 4, the upper portions being empty. If now a current of electricity be sent through the upper coil A, thereby magnetizing its core, the iron filings are attracted upward and fly to the top of the spaces $f\,f$. In so doing each of the separate particles, being magnetized by induction, has the effect of a separate minute magnet moving through the coils $e\,e$, and hence these coils, in addition to being excited by the mere projection of the lines of force from the magnet A through them, are further inductively affected by the bodily movement of the magnetic particles of iron to the same effect as though so many separate small magnets were quickly moved into the coils. This inductive effect is of course of only instantaneous duration. Suppose then the circuit to be instantaneously broken, thereby demagnetizing the upper magnet A. The effect is that the particles of iron lose their magnetism and fall back to the bottom of the spaces $f\,f$, thereby exerting a further inductive influence on the coils $e\,e$. This latter effect will be more powerful if the current is passed through the lower magnet A' at the instant that it is interrupted through the upper magnet, whereby the filings will be strongly attracted downward. This is the operation of the construction shown in Fig. 5. The current may thus be rapidly alternated between the upper and lower magnets, thereby setting the iron filings into a rapid piston-like or vibratory movement between the upper and lower ends of the spaces $f\,f$. The effect will be still further intensified by so connecting the magnets that at each change they will reverse the polarity of the iron filings, which may be done by making the lower end of the upper magnet and the upper end of the lower magnet of both the same polarity—say, for example, north poles. By connecting all the coils $e\,e$ into one secondary circuit, either in series or derivation, this circuit may be made to feed incandescent lamps or arc lamps or alternating-current motors or any other so-called "translating" devices.

The diagram, Fig. 1, shows the preferred connection of the coils A A' when the field is energized by an alternating-current dynamo. The circuit $a\,a$ from this dynamo includes the two coils A A' serially. The alternating impulses in the circuit cause alternations of polarity of the field-magnet and force lines of force through the armature in alternately-opposite directions. It results that the iron filings which are subjected to this rapidly-alternating field are set into active vibration. Their bodily movement may be back and forth in one mass, or the mass may divide and its two portions may fly toward the opposite poles during one phase of the pulsation, and during the succeeding phase they may fall back toward the center of the space, their vibration thus taking place toward and from the center in two masses. The coils $e\,e$ will be so wound as to utilize the peculiar vibratory movement of the iron filings. In this figure the coils of the armature or inductor B are all connected together and arranged to feed a secondary circuit $h$, in which incandescent lamps $l\,l$ are installed. For this purpose the coils $e\,e$ are best connected in multiple arc. In Fig. 3 these coils are shown connected serially, in which case they may be used to feed a secondary circuit $h$, in which is installed an arc lamp L.

Fig. 5 shows two entirely distinct field-magnets A and A', connected together mechanically through a frame consisting of wooden top and bottom plates and intermediate tie-rods. The armature B here consists of three (more or less) separately-wound coils $e\,e$, instead of coils wound concentrically around one another, as in the construction first described. The exciting-circuit is divided into two branches $a\,a'$, in the former of which the magnet-coil A is connected and in the latter is joined the coil A'. Both are fed from a dynamo G', generating continuous currents or from other suitable source of electric energy, by which continuous or practically continuous currents are produced. An alternater H of any suitable construction—such as a vibrating tongue working between two contact-stops $j$ and $j'$—acts to alternate the current between the two branches $a\,a'$. Thus at one instant the magnet A is excited, and at the next instant this magnet is demagnetized and the magnet A' is excited. By transposing the poles of these two magnets so that like poles approach each other the iron filings in the inductor B may be caused to vibrate bodily first toward one magnet and then toward the other. The coils $e\,e$ may be connected to separate secondary circuits, or all to one secondary circuit, as may be desired.

Fig. 6 shows only a single field-magnet A in connection with the armature B, this magnet being energized by a circuit $a$, fed by a continuous-current dynamo G', and the current being short-circuited from the magnet A at suitably-rapid intervals by an interrupter H', consisting of a rheotome arranged in a shunt $a^2$, short-circuiting the coil of the magnet A. The secondary circuit $h'$ is shown as feeding an arc lamp L.

My invention is not confined in its application to converters for changing the character of electric currents, but is applicable also to apparatus for the generation of electric currents in the nature of magneto or dynamo electric machines. Such an application of my invention is shown in Figs. 7 and 8, wherein A and A' designate field-magnets and B the armature. The latter consists of six coils $e\ e$ (more or less) arranged in a circle, the coils being preferably cylindrical bobbins, and each containing within it a chamber $f$, in which is a mass of iron filings $g$, as shown in section at the right in Fig. 7. The several coils $e\ e$ are firmly held in sockets in a ring or plate M, which is fixed to the base P of the apparatus through legs $m$. On an axial shaft Q are mounted two spiders Q' Q', carrying rings R R', of magnetic or magnetizable material. The upper ring has six (more or less) pole-pieces, corresponding in position to the axes of the armature-coils $e\ e$ and projecting downwardly, and the lower ring R' has an equal number of pole-pieces arranged in like manner and projecting upwardly, so that the upper and lower pole-pieces face each other and form fields of force between them. On these pole-pieces are fixed, respectively, coils A A and A' A' of the field-magnet, which are energized by being connected in circuit with a separate field-exciting dynamo, or by the current from the machine itself, or in any other way known to the electrical art, the particular method not being shown. The successive coils A' A' of the ring R' are wound so that the successive cores thereof present alternately north and south poles at their upper ends, and the coils A A of the ring R are wound in like manner, so that the lower ends of the successive pole-pieces are alternately north and south poles. The upper and lower field-magnets are so arranged that a south pole of one approaches a north pole of the other, so that the lines of force stream across between them, extending upwardly between one pair of poles and downwardly between the next pair, and so on in alternation around the circle.

On revolving the shaft Q while the field-magnets are excited in the manner just described each of the armature-coils $e$ will receive at one instant upwardly-projected lines of force from one pair of field and at the next instant downwardly-projected lines of force from the next pair of fields, whereby the iron filings will be attracted in alternately-opposite directions, and currents or electric waves of alternately-opposite potential will be generated in the coil $e$. The several coils $e\ e$ are undergoing simultaneously the same phases of induction, and all may be connected together, either in series or multiple, in order that the currents generated in them may be discharged into a single circuit or each coil may feed a separate circuit. The current issuing from the coils will of course be alternating currents, but may be rectified by the employment of a suitable commutator, as will be well understood by electricians, and which is so common that no illustration is required.

Obviously, instead of revolving the field-magnet and leaving the armature stationary, the field-magnet might be stationary and the armature be revolved.

My invention may be applied for the purpose of generating currents in many other ways than that shown in Figs. 7 and 8, being generally applicable to dynamo-electric machines wherein an armature-core is employed, this core according to my invention being made of iron filings or other comminuted magnetizable material in lieu of being made of solid metal, as heretofore.

Apparatus embodying my invention, in whichever way they may be constructed, need not necessarily be arranged vertically, but may be placed horizontally or at any angle.

The experiments which I have made lead me to believe that by my employment of cores of subdivided iron or iron filings in lieu of solid cores I can secure inductive effects of much greater intensity than heretofore and effect a considerable economy of electric energy and insure the conversion of a greater number of lines of force or energy than has heretofore been possible.

I claim as my invention the following-defined novel features and combinations, substantially as hereinbefore specified, namely:

1. The combination, with a magnetic field, of a loosely-inclosed mass of iron filings placed within the influence of such field, and a coil or coils within inductive influence of said mass, and means for changing or varying the magnetic field, substantially as described, whereby the iron filings are set into vibration.

2. The combination, with an inclosing-coil, of a mass of iron filings loosely confined within it and adapted by its vibration to inductively influence the coil or to be set in vibration by lines of force generated by the coil.

3. An electric generator or converter consisting of a coil or coils, a loosely-confined mass of iron filings inclosed therein, and means for sending lines of magnetic force through said mass and for changing or varying said lines of force, either by alternation or intermission thereof or otherwise.

In witness whereof I have hereunto signed my name in the presence of two subscribing witnesses.

ANGEL DE CASTRO.

Witnesses:
ARTHUR C. FRASER,
JNO. E. GAVIN.